June 8, 1943.     G. E. STILWELL     2,321,165
NAILING MACHINE
Original Filed July 6, 1937
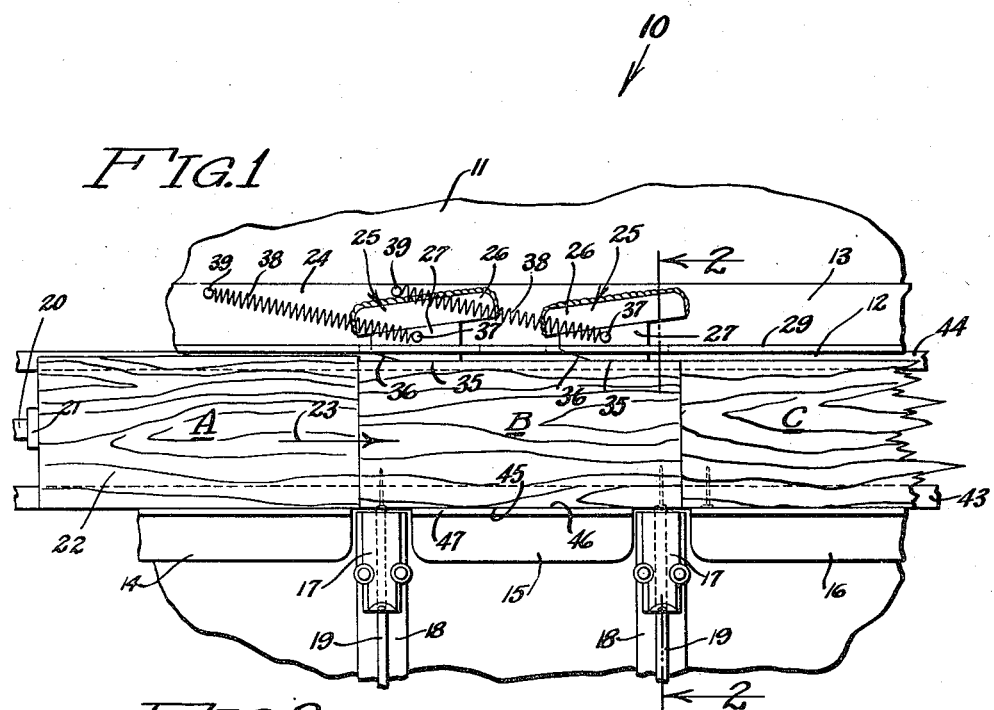
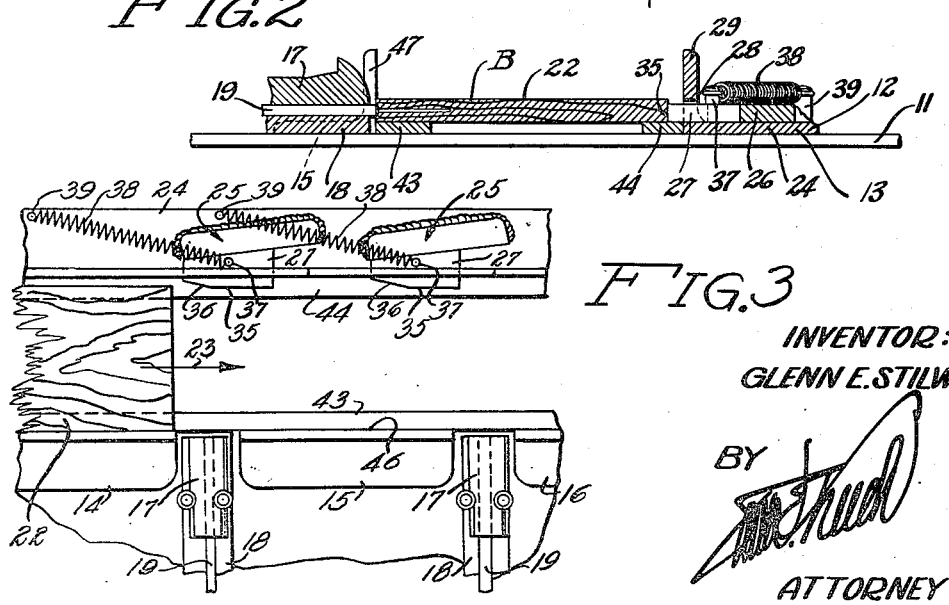
INVENTOR:
GLENN E. STILWELL
BY
ATTORNEY Patented June 8, 1943

2,321,165

UNITED STATES PATENT OFFICE 2,321,165

NAILING MACHINE

Glenn E. Stilwell, Riverside, Calif., assignor to Food Machinery Corporation, San Jose, Calif., a corporation of Delaware Original application July 6, 1937, Serial No. 152,076. Divided and this application May 26, 1941, Serial No. 395,249

5 Claims. (Cl. 1—1)

This invention relates to nailing machines and particularly to a machine in which the pieces of work are delivered in a series through a work-processing position.

The present application is a divisional application, the subject matter thereof being carved from a co-pending joint application of Hale Paxton, Gerald C. Paxton and myself, Serial No. 152,076, filed July 6, 1937, now U. S. Letters Patent No. 2,243,919, said co-pending application disclosing a box head slotting and nailing machine, said machine being commercially referred to as a saw and spiker.

The function of that machine is to saw a slot parallel with one of the longitudinal edges of each box head processed, and then drive heavy nails or spikes into that edge adjacent the ends of the said slot. These box heads are fed through the machine parallel with their longitudinal axis. The width of these heads, that is, their dimension transversely with this axis and with the direction of their travel through the machine, varies considerably. This introduced a difficult problem in the development of this machine in the provision of means whereby the slot would always be located a fixed distance from the edge into which the nails are driven, while at the same time permitting the box head in processing position to be well supported along its opposite edge while the nails are being driven.

It is accordingly an object of this invention to provide a nailing machine in which the pieces of work are fed serially through a processing position in which nails are driven into the work, and in which there is an automatic compensation in the spacing between the anvil supporting the work and the nail chuck means from which nails are driven thereinto, so that as each piece of work enters said processing position it is snugly received between the anvil and the chuck means.

It is a still further object of the invention to provide such a nailing machine in which the compensation above referred to is effected by means engaged by each particular piece of work as it enters the processing position.

The manner of accomplishing the foregoing objects, as well as further objects and advantages, will be made manifest in the following description taken in connection with the accompanying drawing in which Fig. 1 is a fragmentary plan view of a portion of the top plate of a saw and spiker machine as disclosed in the aforesaid co-pending application and illustrating a preferred embodiment of the present invention.

Fig. 2 is an enlarged sectional view taken on the line 2—2 of Fig. 1.

Fig. 3 is a view similar to Fig. 1 illustrating the positions of the anvils of the invention when not contacted by the work.

Referring specifically to the drawing, the nailing machine 10 disclosed therein includes a horizontal top plate 11, of a saw and spiker such as that shown in the co-pending application above identified. Secured to this top plate, on one side of a work runway 12 is an angle iron 13, while secured to said plate on the opposite side of the runway are angle irons 14, 15 and 16. The angle irons 14, 15 and 16 are spaced apart to accommodate fixed nail chucks 17 of a nailing mechanism 18. Slideable in the chucks 17 are nail drivers 19, the operation of which will be made clear hereinafter.

The machine 10 includes a feed mechanism 20 by which a dog 21 is reciprocated to effect the intermittent feeding of a series of the box heads 22 along the runway 12 in the direction of arrow 23. The construction and mode of operation of such a feeding mechanism is well known in the art, as may be noted by reference to the patent to Goff, 1,771,888, dated July 29, 1930. This patent shows such an intermittent feed and also a nailing mechanism actuated in timely relation therewith to drive spikes into the edges of box heads halted opposite the nailing mechanism.

Mounted on a horizontal web 24 of the angle iron 13 is a pair of work responsive anvil mechanisms 25. Each of these mechanisms includes an anvil guide bar 26 which is welded to the web 24 at a slight inclination from the axis of the pathway 12 so as to diverge obliquely from the direction of travel of the box heads 22. Each mechanism 25 also includes a sliding anvil 27 which lies against the upper face of the angle iron web 24 and extends through an opening 28 provided in a vertical web 29 of said angle iron. Each of the anvils 27 has an anvil face 35 which is parallel with the runway 12 and a cam face 36, the purpose of which will be made clear hereinafter.

Provided on each of the anvils 27 is a spring pin 37 which is connected by a contractile spring 38 with a stationary pin 39 provided on the angle iron web 24. The openings 28 are of such length that when the machine 10 is empty of heads, the springs 38 are able to shift the anvils 27 in these openings in the opposite direction from arrow 23, so that the anvil faces 35 of the anvils 27 are disposed inwardly as shown in Fig. 3 in closer relation to the angle iron 15 and chucks 17 than the width of the narrowest of the box heads 22 which the machine 10 is adapted to handle.

While the nailing mechanism 18 is diagrammatically shown in the drawing, this mechanism operates in the well known manner similar to the nailing mechanism in the Goff patent supra, excepting that in the present invention the nail chucks 17 are preferably fixed to the top plate 11 of the machine so as to have no movement relative to the work. In this respect the mounting of the chucks 17 follow the disclosure in the Paxton patent, 1,985,055, issued December 18, 1934, which discloses a fixed nail chuck and means to drive nails therefrom flush with a given fixed plane.

In traveling along the runway 12 the box heads 22 are supported by head supporting rails 43 and 44.

*Operation*

Fig. 1 illustrates the processing position which a box head 22 occupies in the central portion of the machine 10 during each interval between feeding movements of the feed mechanism 20. The box heads 22 are separately designated by characters A, B and C. Box head B is located in the processing position in the machine where it is engaged by the anvil faces 35 of the anvils 27, so as to have its opposite face 45 pressed snugly against the inner face 46 of the vertical flange 47 of the angle iron 15. During the pause between feeding movements, there illustrated, the nailing mechanism 18 is actuated, as in the Goff patent, in timely relation with the feed mechanism 20 to drive nails into the edge 45 of box head B. Owing to the low angle of inclination of the meeting faces of the guide bars 26 and the anvils 27, the shock upon the box head B of having these nails driven thereinto is taken up by the anvils 27 through their anvil faces 35.

The anvil mechanisms 25 are thus seen to automatically provide support for one edge of a box head 22 in a processing position so as to retain this box head in this position while nails are driven into the opposite edge of said head. Anvil mechanisms 25 perform this function irrespective of variations in the width of the box heads 22. Box head A, for instance, is shown a little wider than box head B. When the next feeding movement takes place box head A will engage the cam face 36 of the first anvil 27 and cause the latter to shift rightwards. This continues until, by sliding along the guide face of the adjacent guide bar 26, this anvil moves out from in front of the box head A, after which it will be merely held in snug sliding relation with the adjacent longitudinal edge of the box head A as the latter slides past the first of the anvils 27. In the same way, the first contact of the box head A with the second anvil 27 will cause the rightward sliding of this second anvil until it also is away from in front of this box head. This anvil thenceforth retains a snug sliding relation with this head during the rest of the movement of the latter into processing position.

From the foregoing description it becomes clear that the anvil mechanisms 25 automatically compensate for variations in width of the box heads 22. These mechanisms not only urge the edge 45 of each head in processing position flush against the face 46 of the angle iron 15, but they supply anvil support for the opposite edge of this head while spikes are being driven into the edge 45.

While I have shown and described herein only a single embodiment of my invention, it is to be understood that various modifications and adaptations can be made in this without departing from the spirit of the invention or the scope of the appended claims.

What I claim is:

1. In a nailing machine, the combination of: nail chuck means; anvil means spaced therefrom for rigidly supporting work disposed therebetween and absorbing the shock imparted to said work by the driving of nails thereinto from said chuck means; means for feeding a series of individual pieces of work varying in transverse dimension through the space between said nail chuck means and said anvil means and in a direction parallel with said chuck means and anvil means; means responsive to the individual pieces of work as they are so fed for adjusting said space to snugly fit the transverse dimension of the particular piece of work disposed in said space; and means for driving a nail from said chuck means into said particular piece of work while the latter is disposed in said space.

2. In a nailing machine, the combination of: nail receiving edge guide means; anvil means spaced therefrom for rigidly supporting work disposed therebetween and absorbing the shock imparted to said work by the driving of a nail into the nail-receiving edge of said work; means for feeding a series of individual pieces of work varying in transverse dimension through the space between said guide means and said anvil means and in a direction parallel with said guide means and said anvil means; means responsive to the individual pieces of work as they are so fed for adjusting said space to snugly fit the transverse dimension of the particular piece of work disposed in said space; a nail chuck having a fixed relation with said guide means; and means for driving a nail from said chuck into said nail receiving edge of said particular piece of work while the latter is disposed in said space.

3. In a nailing machine, the combination of: nail chuck means; anvil means spaced therefrom for rigidly supporting work disposed therebetween and absorbing the shock imparted to said work by the driving of nails thereinto from said chuck means; means for feeding a series of individual pieces of work varying in transverse dimension through the space between said nail chuck means and said anvil means; means responsive to each individual piece of work as it is entering said space for adjusting said space to snugly fit the transverse dimension of the particular piece of work so entering said space; and means for driving a nail from said chuck means into said particular piece of work while the latter is disposed in said space.

4. In a nailing machine, the combination of: nail chuck means having a fixed position; anvil means spaced therefrom for rigidly supporting work disposed therebetween and absorbing the shock imparted to said work by the driving of nails thereinto from said chuck means; means for feeding a series of individual pieces of work varying in transverse dimension through the space between said nail chuck means and said anvil means; means responsive to engagement of said anvil means with each individual piece of work as the latter enters said space for shifting said anvil means relative to said chuck means for adjusting said space to snugly fit the transverse dimension of the particular piece of work thus entering said space; and means for driving a nail from said chuck means into said particular piece of work while the latter is disposed in said space.

5. In a nailing machine, the combination of: a primary guide means; a secondary guide means spaced therefrom; means for feeding a series of individual pieces of work varying in transverse dimension through the space between said primary and secondary guide means; means for mounting said secondary guide means for sliding movement obliquely away from said primary guide means when said secondary guide means is engaged by an individual piece of work entering said space; means for urging said secondary guide means in the opposite direction to automatically take up any slack in the space between said secondary guide means and said primary guide means and cause each particular piece of work entering said space to be snugly held between said guide means; a nail chuck mounted to have a fixed relation with one of said guide means, the other of said guide means being disposed opposite said nail chuck and serving as an anvil during said nail driving operation to rigidly support said work and absorb the shock of a nail being driven into said work from said nail chuck; and means for driving a nail from said nail chuck into said particular piece of work while the latter is disposed in said space.

GLENN E. STILWELL.